United States Patent [19]
Kinoshita

[11] Patent Number: 5,964,536
[45] Date of Patent: Oct. 12, 1999

[54] BEARING FOR A VEHICLE STEERING COLUMN

[75] Inventor: Satoshi Kinoshita, Aichi, Japan

[73] Assignee: Fuji Kiko Co., Ltd., Tokyo, Japan

[21] Appl. No.: 08/935,030

[22] Filed: Sep. 22, 1997

[30] Foreign Application Priority Data

Sep. 26, 1996 [JP] Japan .................................. 8-254102

[51] Int. Cl.[6] .................................................. F16C 17/00
[52] U.S. Cl. ............................................................. 384/441
[58] Field of Search ................................... 384/903, 441, 384/428, 538, 539

[56] References Cited

U.S. PATENT DOCUMENTS

| | | | |
|---|---|---|---|
| 4,364,615 | 12/1982 | Euler | 384/903 |
| 4,614,444 | 9/1986 | Hines | 384/138 |
| 5,110,233 | 5/1992 | Hoblingre et al. | 403/12 |
| 5,143,456 | 9/1992 | Joerdens et al. | 384/275 |
| 5,192,137 | 3/1993 | Renard | 384/275 |
| 5,259,818 | 11/1993 | Kachi et al. | 464/89 |
| 5,261,748 | 11/1993 | Kameda | 384/222 |
| 5,348,345 | 9/1994 | Dykema et al. | 280/777 |
| 5,368,397 | 11/1994 | Freiwald | 384/130 |
| 5,505,548 | 4/1996 | Stewart | 384/903 |
| 5,564,313 | 10/1996 | Hoblingre | 74/492 |

FOREIGN PATENT DOCUMENTS

| | | |
|---|---|---|
| 46-12015 | 4/1971 | Japan . |
| 57-117273 | 7/1982 | Japan . |
| 1-28338 | 8/1989 | Japan . |
| 7-186973 | 7/1995 | Japan . |

*Primary Examiner*—Lenard A. Footland
*Attorney, Agent, or Firm*—Foley & Lardner

[57] ABSTRACT

A bearing includes a bushing having an axis and a retainer supporting the bushing. The retainer includes an annular planar portion extending perpendicular to the axis and a plurality of wedge portions projecting radially outward from the annular planar portion in circumferentially spaced relation.

29 Claims, 4 Drawing Sheets

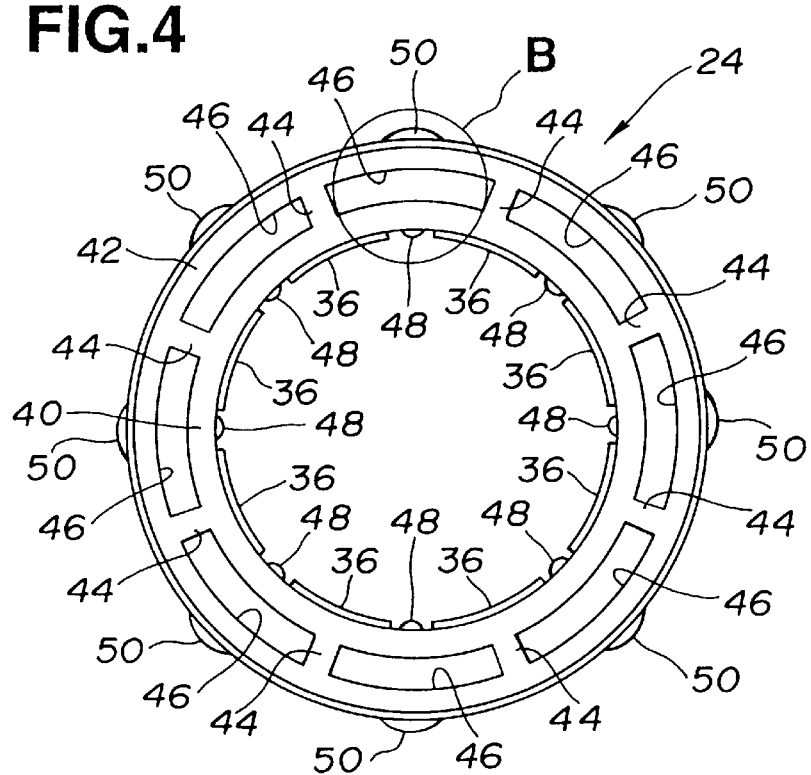
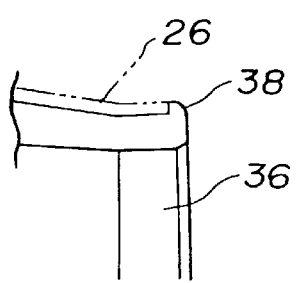
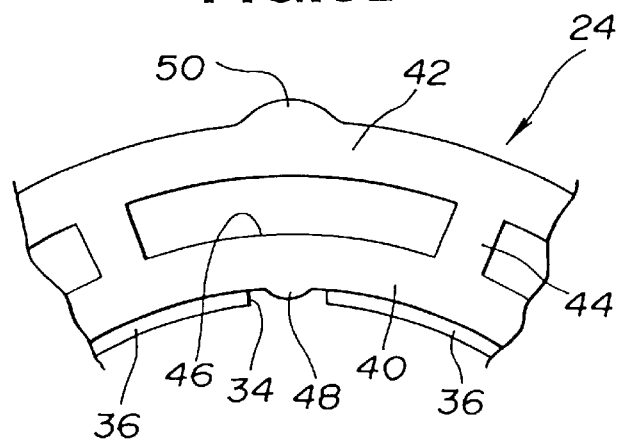

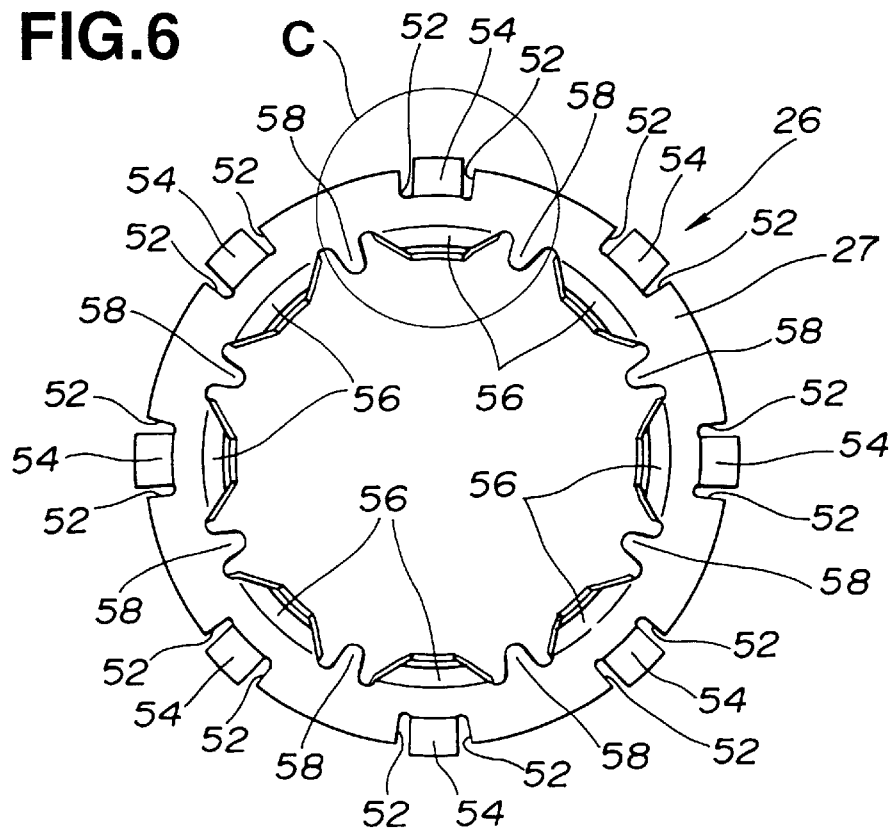
FIG.6
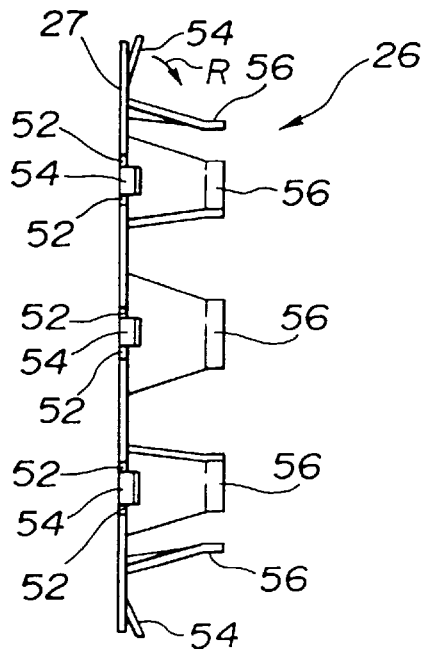
FIG.7
FIG.8

BEARING FOR A VEHICLE STEERING COLUMN

BACKGROUND OF THE INVENTION

1. Field of the Invention

The present invention relates to a bearing for a vehicle steering column, which supports a steering shaft within a housing for rotation about an axis and tiltable movement of the steering shaft relative to the axis.

2. Description of Related Art

Various kinds of bearings for a vehicle steering column are well known. Among them, bearings made of synthetic resin materials have been proposed. Such bearings made of resin materials are securely mounted to a housing of the steering column and support a steering shaft disposed substantially concentrically with the housing such that the steering shaft is smoothly tiltable and rotatable relative to the housing.

Japanese Utility Model Application First Publication No. 57-117273 discloses a bearing for a vehicle steering column, which is made of a resin material. The bearing is fitted to a lower end portion of a housing of the steering column. The bearing includes a cylindrical larger-inner-diameter portion with a flange and a smaller-inner-diameter portion with tongues. The flange is engaged with the lower distal end of the housing. The tongues are adapted to contact a steering shaft received into the bearing. The steering shaft is rotatably supported by the tongues in its normal operation and by the larger-inner-diameter portion upon causing a larger tilting movement relative to the housing. A projection extending outwardly from an outer cylindrical surface of the bearing is engaged in a hole formed in a cylindrical wall of the housing for securing of the bearing to the housing.

In conventional bearings of such a type, the formation of the projection-insertion hole of the housing deteriorates a cost performance. Further, upon assembling the steering column by fitting the bearing into the housing, operations for alignment and engagement of the projection with the hole are inconvenient.

Japanese Utility Model Application Second Publication No. 1-28338 discloses a bearing for a vehicle steering column, which is made of a synthetic resin material. The bearing is press-fitted to a lower end portion of a housing of the steering column. The bearing includes a bearing body and an elastic bushing engaged with the bearing body. The bearing body has tongues contacted with the steering shaft at inner peripheries thereof. A resilient ring is fixed onto the tongues to bias the tongues against the steering shaft. When vibration is applied to the steering shaft to urge the steering shaft onto the elastic bushing, the elastic bushing absorbs the vibration to restrain noise from being caused by abutment of the steering shaft against the bearing body.

In conventional bearings of such a type, there is a likelihood that a clearance is produced between a whole body of the bearing and the housing due to aging and deterioration of the resin material of the bearing with the elapse of time. The clearance influences securement of the bearing to the housing and thus retention of the steering shaft relative to the housing.

SUMMARY OF THE INVENTION

An object of the present invention is to provide an improved bearing for a vehicle steering column which is capable of being readily mounted to a housing and securely retained in the housing.

A further object of the present invention is to provide an improved steering shaft supporting structure in which a steering shaft is held by a bearing without undesirable displacement relative to the housing after being assembled to the housing.

According to one aspect of the present invention, there is provided a bearing comprising:

a bushing having an axis; and a retainer supporting the bushing, said retainer including an annular planar portion extending perpendicular to the axis and a plurality of wedge portions projecting radially outward from the annular planar portion in circumferentially spaced relation.

According to another aspect of the present invention, there is provided a steering shaft supporting structure, comprising:

a housing;

a steering shaft disposed within the housing for rotation about an axis and tiltable movement relative to the axis; and a bearing disposed between the steering shaft and the housing, the bearing including a bushing and a retainer supporting the bushing;

the retainer including an annular planar portion extending perpendicular to the axis and a plurality of wedge portions projecting radially outward from the annular planar portion in circumferentially spaced relation to lock a movement of the bearing relative to the housing in one axial direction.

BRIEF DESCRIPTION OF THE DRAWINGS

FIG. 4 is an enlarged top plan view of the bushing of FIG. 1;

FIG. 5A is a fragmentary enlarged diagram of a circled portion A of FIG. 3;

FIG. 5B is a fragmentary enlarged diagram of a circled portion B of FIG. 4;

FIG. 6 is an enlarged bottom plan view of a retainer of the bearing of FIG. 1;

FIG. 7 is a side view of the retainer of FIG. 6; and

FIG. 8 is a fragmentary enlarged diagram of a circled portion C of FIG. 6.

DESCRIPTION OF THE PREFERRED EMBODIMENT

Figure 1:
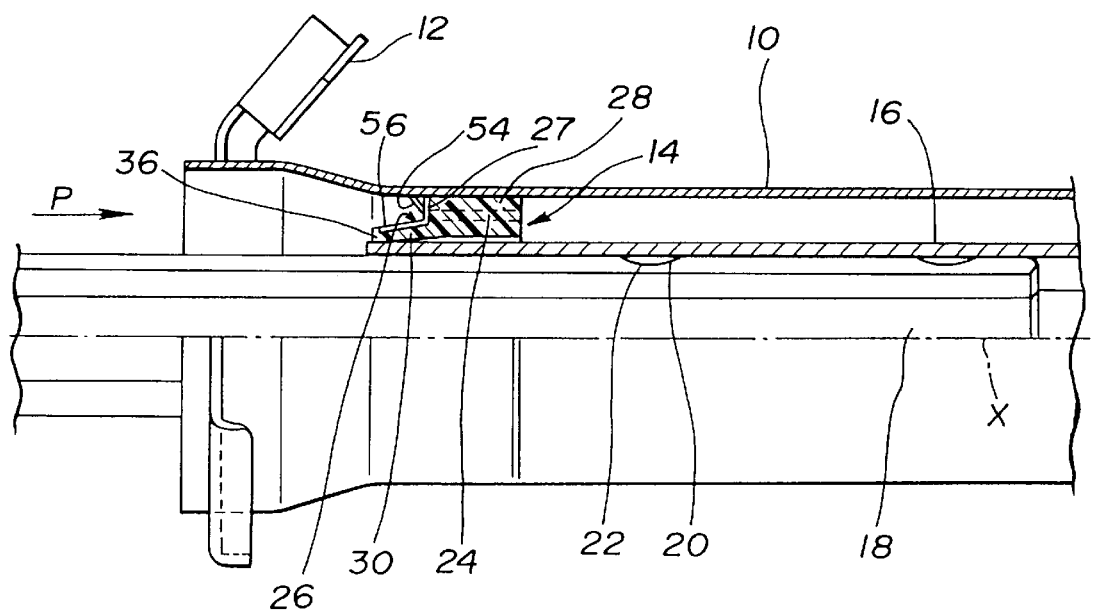
FIG. 1 is a fragmentary diagram of a vehicle steering column into which a bearing according to the present invention is installed.

Referring now to FIG. 1, there is shown a part of a vehicle steering column to which a bearing according to a preferred embodiment of the present invention is installed. In FIG. 1, an upper part of the steering column, as viewed relative to a center axis X of the steering column, is shown in longitudinal section, while a lower part of the steering column, as viewed relative to the center axis X, is shown in side view.

As illustrated in FIG. 1, the vehicle steering column includes a housing 10 and a steering shaft disposed in the housing 10. The housing 10 and the steering shaft are concentrically disposed with the center axis X. The steering shaft is composed of upper and lower shafts 16 and 18. The housing 10 is in the form of a tubular jacket. A bracket 12 is secured to a lower end portion of the housing 10, through which the housing 10 is fixed to a vehicle body. The bearing indicated at 14, is fitted to the housing 10 and supports the steering shaft. The bearing 14 is concentrical with the steering shaft and disposed at a lower end portion of the upper shaft 16 of the steering shaft. The upper shaft 16 is supported rotatably about the center axis X and tiltably relative to the center axis X by the bearing 14. The lower shaft 18 is disposed within the upper shaft 16 in concentrical relation thereto. The lower shaft 18 is formed with a circumferential groove 20 on its outer circumferential surface. The circumferential groove is filled with a synthetic resin 22 such that when a load of not more than a predetermined value is applied to the lower shaft 18, the lower shaft 18 can be held in place relative to the upper shaft 16 without being axially displaced.

The bearing 14 includes a bushing 24 and a retainer 26 supporting the bushing 24. The bushing 24 and the retainer 26 are engaged with each other to form a unit. The retainer 26 is engaged with an inside surface of the housing 10 to lock a movement of the bearing 14 relative to the housing 10 in one axial direction in which direction the bearing 14 is removed from the housing 10. The one axial direction is opposite to an axial direction indicated by an arrow P in FIG. 1.

Figure 2:
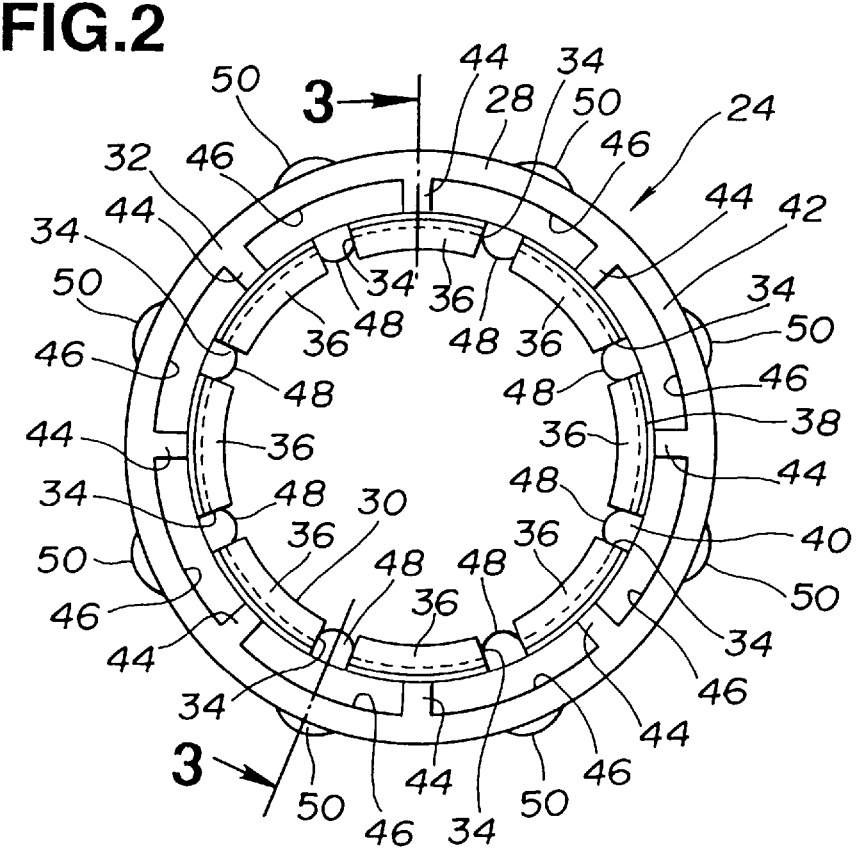
FIG. 2 is an enlarged bottom plan view of a bushing of the bearing shown in FIG. 1.
Figure 3:
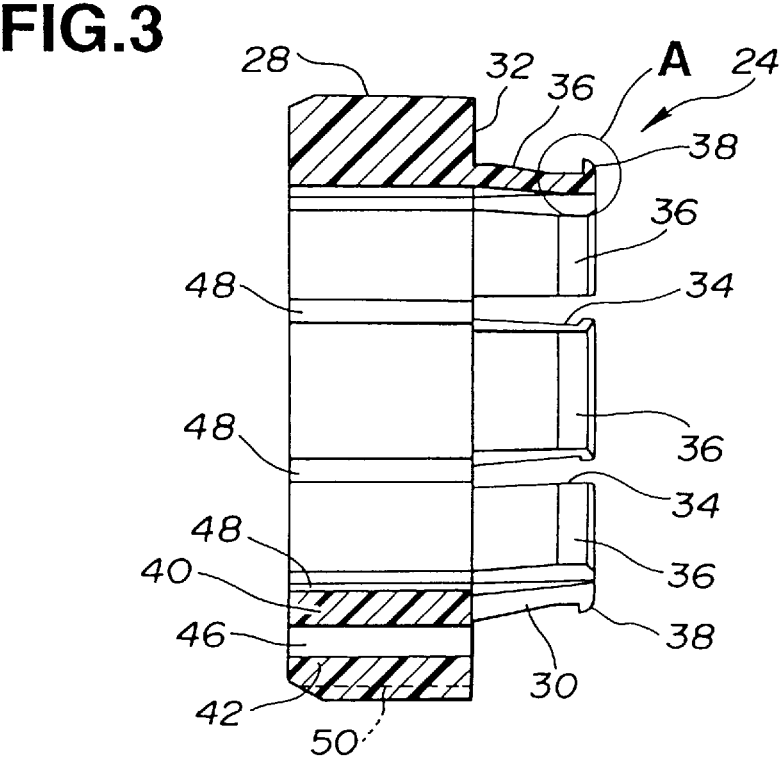
FIG. 3 is a section taken along the line 3—3 of FIG. 2.

Specifically, the bushing 24, which is made of a synthetic resin material, has an axis consistent with the center axis X of the steering shaft. As illustrated in FIGS. 1 to 3, the bushing 24 includes a cylindrical portion 28 and a generally frustoconical portion 30 connected with the cylindrical portion 28. The cylindrical portion 28 has an outer diameter substantially the same as an inner diameter of the housing 10. The frustoconical portion 30 has a smaller outer diameter than the cylindrical portion 28 and decreases in outer diameter in the one axial direction. The frustoconical portion 30 has the same inner diameter as the cylindrical portion 28 at its one end connected with the cylindrical portion 28 and decreases in inner diameter in the one axial direction.

The cylindrical portion 28 and the frustoconical portion 30 cooperate to define a shoulder portion 32 disposed therebetween. The frustoconical portion 30 includes a plurality of slits 34 and a plurality of tongue portions 36. Each slit 34 and each tongue portion 36 are arranged circumferentially alternately with each other. The slit 34 and the tongue portion 36 extend from a radial inner periphery of the cylindrical portion 28 along the one axial direction. The slits 34 act as a meshing portion for coupling the bushing 24 with the retainer 26, as explained later. The tongue portions 36 have a bearing surface contacting an outer surface of the upper shaft 16. The bearing surface is located on an inner side of one distal end portion of each tongue portion 36 opposed to the other end portion connected with the radial inner periphery of the cylindrical portion 28. A stop 38 for limiting an axial movement of the retainer 26 relative to the bushing 24 is disposed on an outer side of the distal end portion of the tongue portion 36 in a substantially opposed relation to the bearing surface. In FIG. 5A, the point at which the retainer 26 is engaged with the stop 38 is indicated by a phantom line. The stop 38 is integrally formed with the bushing 24.

As illustrated in FIGS. 2 to 4 and 5B, the cylindrical portion 28 of the bushing 24 has a radially spaced double-walled structure including an inner wall 40, an outer wall 42 and ribs 44 interconnecting the inner and outer walls 40 and 42. The ribs 44 radially extend between the inner and outer walls 40 and 42 and are circumferentially spaced at a predetermined distant to define window-like slots 46 each of which is a part of an annular clearance between the walls 40 and 42. The inner wall 40 has inner protrudent portions 48 extending radially inward from an inner circumferential surface thereof. The inner protrudent portions 48 are integrally formed with the inner wall 40. The inner protrudent portions 48 are circumferentially spaced apart from each other by a predetermined distance and circumferentially alternate with the ribs 44. The inner protrudent portions 48 are arranged corresponding to the window-like slots 46 on the inside thereof. The inner protrudent portions 48 are also disposed substantially in circumferential alignment with the slits 34 of the frustoconical portion 30 and extend axially over an entire axial length of the cylindrical portion 28. With this arrangement, in a case where the upper shaft 16 tilts relative to the center axis X of the steering shaft, the inner protrudent portions 48 contact the outer surface of the upper shaft 16 so that the inner wall 40 is flexibly deformable radially outward, namely, toward the outer wall 42. Similarly, the outer wall 42 has outer protrudent portions 50 extending radially outward from an outer circumferential surface thereof and integrally formed with the outer wall 42. The outer protrudent portions 50 are circumferentially spaced by a predetermined distance and circumferentially alternate with the ribs 44. The outer protrudent portions 50 are arranged corresponding to the window-like slots 46 on the outside thereof. As well as the inner protrudent portions 48, the outer protrudent portions 50 are substantially circumferentially aligned with the slits 34 of the frustoconical portion 30 and extend axially over the entire axial length of the cylindrical portion 28. With the provision of the window-like slots 46 and the outer protrudent portions 50, the outer wall 42 is flexibly deformable to move radially inward when the bearing 14 is press-fitted to the housing 10. The double-walled structure of the bushing 24 eliminates misfit of the cylindrical portion 28 of the bushing 24 to the housing 10 which is caused by the dimensional deviation of the inner diameter of the housing 10 and the outer diameter of the cylindrical portion 28.

As illustrated in FIGS. 6 to 8, the retainer 26 includes an annular planar portion 27 and a plurality of wedge portions 54 projecting radially outward from the annular planar portion 27. The annular planar portion 27 has a flat surface extending perpendicular to the axis of the bushing 24 and thus to the center axis X of the steering column. The wedge portions 54 are disposed on an outer peripheral portion of the annular planar portion 27 and are arranged in circumferentially spaced relation, preferably equidistantly spaced relation to each other. The wedge portions 54 are inclined in the one axial direction opposite to the direction P shown in FIG. 1 at a predetermined angle relative to the flat surface of the annular planar portion 27. In other words, the wedge portions 54 are disposed in an angular position relative to the axis of the bushing 24 when the bushing 24 and the retainer 26 are coupled together. When fitted to the housing 10 as shown in FIG. 1, the wedge portions 54 are disposed in an angular position relative to the center axis X. Each wedge portion 54 is at its initial inclined position as shown in FIG. 7, when the bearing 14 is not fitted to the housing 10. The wedge portions 54 are designed so as to have an outer diameter larger than the inner diameter of the housing 10 at the initial inclined position.

The retainer 26 includes a plurality of pairs of slits 52, 52 disposed on the outer peripheral portion of the annular planar portion 27. Each pair of slits 52, 52 extend radially inward from the outer peripheral edge of the annular portion 27 to define the wedge portions therebetween. The pairs of slits 52, 52 are disposed in such a relation as circumferentially spaced by a predetermined distance from each other.

Each wedge portion 54 has a hinge line extending between the bottoms of each pair of slits 52, 52, at which the wedge portion 54 is hinged to the annular planar portion 27. The wedge portion 54 is resilient so as to be rotatable about the hinge line in a direction R as shown in FIG. 7 to move from the initial inclined position in response to a force applied to one side thereof, left side as viewed in FIG. 7, and rotatable about the hinge line in a direction opposite to the direction R to return to the initial inclined position in response to release of the force therefrom. In this embodiment, the retainer 26 as a whole is made of a leaf spring and the wedge portions 54 are integrally formed with the annular portion 27.

The retainer 26 also includes a plurality of arm portions 56 extending from an inner periphery of the annular planar portion 27 along the one axial direction. The arm portions 56 have substantially the same configuration as the tongue portions 36 of the bushing 24 so as to overlap the tongue portions 36 when the retainer 26 is coupled with the bushing 24 as shown in FIG. 1. The arm portions 56 bias the tongue portions 36 against the outer surface of the upper shaft 16 when the bearing 14 is mounted to the housing 10 of the steering column. Thus, the arm portions 56 cause the bearing surface of the tongue portions 36 to be always in engagement with the outer surface of the upper shaft 16.

The retainer 26 includes a meshing portion corresponding to the meshing portion, i.e. the slits 34, of the bushing 24. The meshing portion of the retainer 26 is in the form of radial inner projections 58 extending radially inward from the inner periphery of the annular planar portion 27 and disposed circumferentially alternately with the arm portions 56. The radial inner projections 58 are engaged with the slits 34 to couple the bushing 24 and the retainer 26 together. This engagement of the radial inner projections 58 of the retainer 26 with the slits 34 prevents a relative rotating movement of the bushing 24 and the retainer 26. A relative axial movement of the bushing 24 and the retainer 26 in the direction P of FIG. 1, is limited by engagement of the annular planar portion 27 of the retainer 26 with a radially extending surface of the shoulder 32 of the bushing 24. A relative axial movement of the bushing 24 and the retainer 26 in the one axial direction opposite to the direction P of FIG. 1, is prevented by engagement of tapered distal ends of the arm portions 56 as indicated by phantom line in FIG. 5A, with the stops 38 of the tongue portions 36 as indicated by solid line in FIG. 5A.

Upon mounting, the bearing 14 is forcedly inserted into the housing 10 from a lower end, i.e., from the left side as viewed in FIG. 1, thereof in the axial direction P shown in FIG. 1 in a manner such that the retainer 26 coupled with the bushing 24 is oriented in the axial direction opposite to the direction P. During the press-fitting operation of the bearing 14, the wedge portions 54 of the retainer 26 are urged to rotate in the direction R against a resilient force thereof by the contact with the inside surface of the housing 10. The wedge portions 54 do not act during the press-fitting operation of the bearing 14. When the bearing 14 is positioned in a predetermined place relative to the housing 10, the bearing 14 is released from the press-fitting force so that the wedge portions 54 are allowed to rotate in the direction opposite to the direction R by the resilient force thereof. Thus, the wedge portions 54 move toward the initial inclined position and engage the inside surface of the housing 10. By this engagement, the wedge portions 54 hold the bearing 14 in the predetermined place within the housing 10, and even when the upper shaft 16 rotates, the bearing 14 is restrained from a unitary rotation therewith.

On the other hand, when a load is applied to the upper shaft 16 to force the bearing 14 to move from the predetermined position relative to the housing 10 in the axial direction opposite to the axial direction P of FIG. 1 toward the lower end of the housing 10, the wedge portions 54 of the retainer 26 act as wedges and are kept in engagement with the inside surface of the housing 10. This is because, as explained above, the wedge portions 54 extend radially outward beyond an outer peripheral edge of the annular planar portion 27. By the engagement with the inside surface of the housing 10, the wedge portions 54 lock the movement of the bearing 14 relative to the housing 10 in the axial direction opposite to the axial direction P. Thus, the wedge portions 54 are operative to prevent the bearing 14 from moving relative to the housing 10 in the axial direction opposite to the press-fitting direction P when the load is applied to the upper shaft 16 of the steering shaft in the opposite axial direction.

Even when the tongue portions 36 of the bushing 24 are deteriorated in resiliency due to aging, the arm portions 56 of the retainer 26 compensate the deteriorated resiliency to keep the tongue portions 36 biased against the upper shaft 16. Thus, the upper shaft 16 is kept rotatably and tiltably supported by the tongue portions 36.

Further, even in a case where a clearance between the cylindrical portion 28 of the bushing 24 and the inside surface of the housing 10 is produced due to aging of the bushing 24, the bearing 14 as a whole is secured to the housing 10 by the engagement of the wedge portions 54 of the retainer 26 with the inside surface of the housing 10. Thus, the bearing 14 serves for restraining undesired displacement of the upper shaft 16 relative to the housing 10.

As is appreciated from the above description, the bearing 14 of the present invention can be easily mounted to the housing 10 and prevented from being displaced relative to the housing in such a direction as to be undesirably removed out of the housing 10. The bearing 14 of the present invention can be held in place relative to the housing 10 without being influenced by a clearance therebetween caused due to aging of the bearing 14 made of resin.

In addition, it will be appreciated that the steering shaft supporting structure of the present invention assures the rotational and tilting movement of the upper shaft 16 relative to the housing 10.

What is claimed is:

1. A bearing comprising:
   a bushing having an axis, said bushing including a cylindrical portion and a plurality of tongue portions extending from a radial inner periphery of the cylindrical portion in one axial direction to define a shoulder portion between the cylindrical portion and the plurality of tongue portions; and
   a retainer supporting the bushing, said retainer including an annular planar portion extending perpendicular to the axis and a plurality of wedge portions projecting radially outward from the annular portion in a circumferentially spaced relation.

2. A bearing as claimed in claim 1, wherein said plurality of wedge portions of the retainer are inclined relative to the axis.

3. A bearing as claimed in claim 1, wherein said plurality of wedge portions of the retainer are inclined relative to the annular planar portion.

4. A bearing as claimed in claim 1, wherein the retainer includes a plurality of pairs of slits disposed on an outer peripheral portion of the annular mount portion, said plurality of wedge portions being interposed between each pair of said plurality of pairs of slits.

5. A bearing as claimed in claim 1, wherein the bushing is made of a resin material.

6. A bearing as claimed in claim 1, wherein the annular planar portion of the retainer is engaged with the shoulder portion of the bushing.

7. A bearing as claimed in claim 1, wherein the retainer includes a plurality of arm portions extending from an inner periphery of the annular planar portion over the tongue portions in the one axial direction, said plurality of arm portions biasing the tongue portions radially inward.

8. A bearing as claimed in claim 7, wherein the bushing includes stops disposed on the tongue portions in engagement with distal ends of the arm portions of the retainer.

9. A bearing as claimed in claim 1, wherein the retainer and the bushing include meshing portions engaged with each other to couple the retainer and the bushing together.

10. A bearing as claimed in claim 9, wherein the meshing portion of the retainer includes radial inner projections extending radially inward from the inner periphery of the annular planar portion and disposed alternately with the arm portions, and the meshing portion of the bushing includes slits axially extending and arranged circumferentially alternately with the tongue portions.

11. A bearing as claimed in claim 1, wherein the tongue portions of the bushing cooperate to form a generally frustoconical portion connected with the cylindrical portion, said generally frustoconical portion being smaller in outer diameter than the cylindrical portion and decreasing in outer diameter in the one axial direction.

12. A bearing as claimed in claim 11, wherein the cylindrical portion of the bushing has a radially spaced double-walled structure including an inner wall, an outer wall and ribs interconnecting the inner and outer walls.

13. A bearing as claimed in claim 12, wherein the inner wall has inner protrudent portions extending radially inward from its inside surface, said inner protrudent portions extending axially and being arranged in circumferentially alternately with the ribs.

14. A bearing as claimed in claim 12, wherein the outer wall has outer protrudent portions extending radially outward from its outside surface, said outer protrudent portions extending axially and being arranged in circumferentially alternately with the ribs.

15. A bearing as claimed in claim 1, wherein the retainer is made of a leaf spring.

16. A steering shaft supporting structure, comprising:
   a housing;
   a steering shaft disposed within said housing, wherein said steering shaft rotates about an axis and tilts relative to said axis; and
   a bearing disposed between said steering shaft and said housing, said bearing including a bushing and a retainer supporting said bushing,
   wherein said retainer includes an annular planar portion extending perpendicular to the axis and a plurality of wedge portions projecting radially outward from the annular planar portion in a circumferentially spaced relation to lock a movement of the bearing relative to the housing in one axial direction, and
   wherein said bushing includes a cylindrical portion retained by the annular planar portion of said retainer and a plurality of tongue portions extending from a radial inner periphery of said cylindrical portion in said one axial direction.

17. A steering shaft supporting structure as claimed in claim 16, wherein the retainer is made of a leaf spring.

18. A steering shaft supporting structure as claimed in claim 16, wherein said plurality of wedge portions of the retainer are inclined relative to the axis.

19. A steering shaft supporting structure as claimed in claim 16, wherein said plurality of wedge portions of the retainer are inclined relative to the annular planar portion.

20. A steering shaft supporting structure as claimed in claim 16, wherein the retainer includes a plurality of pairs of slits disposed on an outer peripheral portion of the annular planar portion, said plurality of wedge portions being interposed between each pair of said plurality of pairs of slits.

21. A steering shaft supporting structure as claimed in claim 16, wherein the bushing is made of a resin material.

22. A steering shaft supporting structure as claimed in claim 16, wherein the retainer includes a plurality of arm portions extending from an inner periphery of the annular planar portion in the one axial direction and overlapping to bias the tongue portions of the bushing against the steering shaft.

23. A steering shaft supporting structure as claimed in claim 16, wherein the retainer and the bushing include meshing portions engaged with each other to couple the retainer with the bushing together.

24. A steering shaft supporting structure as claimed in claim 23, wherein the meshing portion of the retainer includes radial inner projections extending radially inward from the inner periphery of the annular planar portion and alternately with the arm portions, and the meshing portion of the bushing includes slits axially extending and disposed circumferentially alternately with the tongue portions.

25. A steering shaft supporting structure as claimed in claim 23, wherein the bushing includes stops disposed on the tongue portions in engagement with distal ends of the arm portions of the retainer.

26. A steering shaft supporting structure as claimed in claim 16, wherein the tongue portions of the bushing cooperate to form a generally frustoconical portion connected with the cylindrical portion, said generally frustoconical portion being smaller in outer diameter than the cylindrical portion and decreasing in outer diameter in the one axial direction.

27. A steering shaft supporting structure as claimed in claim 26, wherein the cylindrical portion of the bushing has a radially spaced double-walled structure including an inner wall, an outer wall and ribs interconnecting the inner and outer walls.

28. A steering shaft supporting structure as claimed in claim 27, wherein the inner wall has inner protrudent portions engageable with the steering shaft when the steering shaft tilts relative to the axis, said inner protrudent portions extending axially and radially inward from its inside surface and arranged in circumferentially alternately with the ribs.

29. A steering shaft supporting structure as claimed in claim 27, wherein the outer wall has outer protrudent portions engaged with the housing, said outer protrudent portions extending axially and radially outward from its outside surface and arranged in circumferentially alternately with the ribs.

* * * * *